United States Patent [19]

Kuska et al.

[11] 4,313,252
[45] Feb. 2, 1982

[54] ARRANGEMENT FOR AUTOMATICALLY CHANGING CLAMPING JAWS OF THE CHUCK OF A MACHINE TOOL

[75] Inventors: Joachim Kuska, Langenhagen; Günter Twiefel, Burgwedel, both of Fed. Rep. of Germany

[73] Assignee: Gildemeister AG, Bielefeld, Fed. Rep. of Germany

[21] Appl. No.: 91,054

[22] Filed: Nov. 5, 1979

[30] Foreign Application Priority Data

Nov. 13, 1978 [DE] Fed. Rep. of Germany ....... 2849188

[51] Int. Cl.³ .............................................. B23Q 3/155
[52] U.S. Cl. .................................................... 29/568
[58] Field of Search ................... 82/2 R, 2 B; 29/568; 408/35

[56] References Cited

U.S. PATENT DOCUMENTS 4,100,671   7/1978   Junike et al. .................... 29/568

FOREIGN PATENT DOCUMENTS 2805828   8/1979   Fed. Rep. of Germany ........ 29/568

Primary Examiner—Leonidas Vlachos
Attorney, Agent, or Firm—Owen, Wickersham & Erickson

[57] ABSTRACT

An arrangement for automatically changing clamping jaws of the chuck of a machine tool having a turning carriage and a cross-slide rest. A clamping jaw magazine has guides for the clamping jaws stored therein which may be aligned with the clamping jaw guides of the chuck. A transfer device has a transfer element which is displaceable in the direction of the alignment guides, and this transfer element is provided on the cross-slide rest.

12 Claims, 6 Drawing Figures

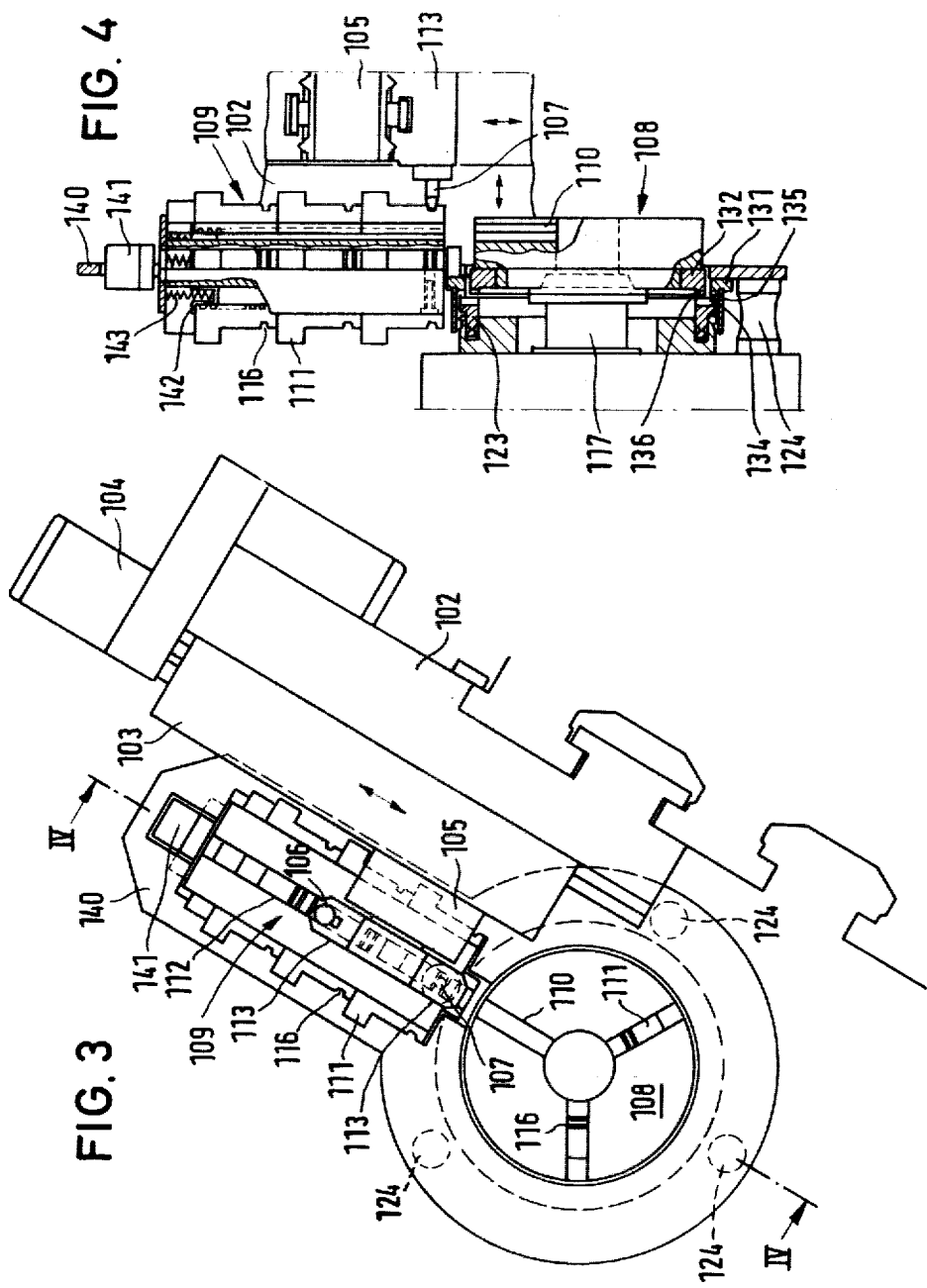

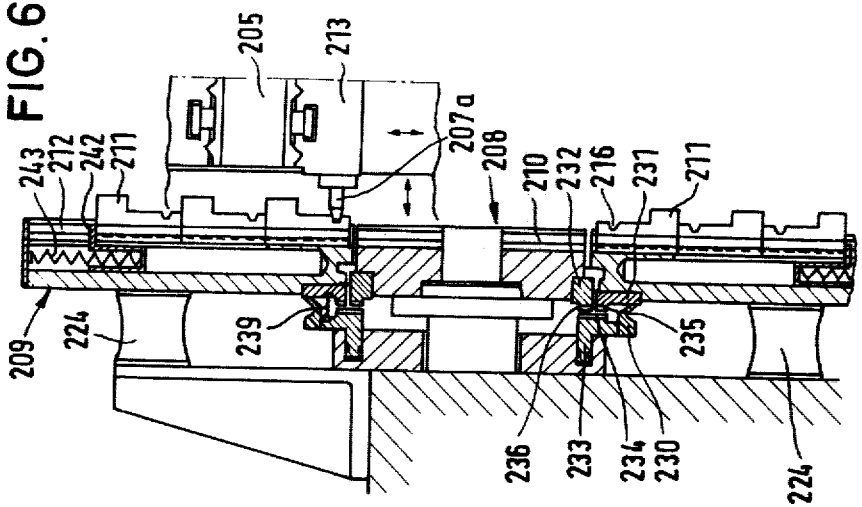
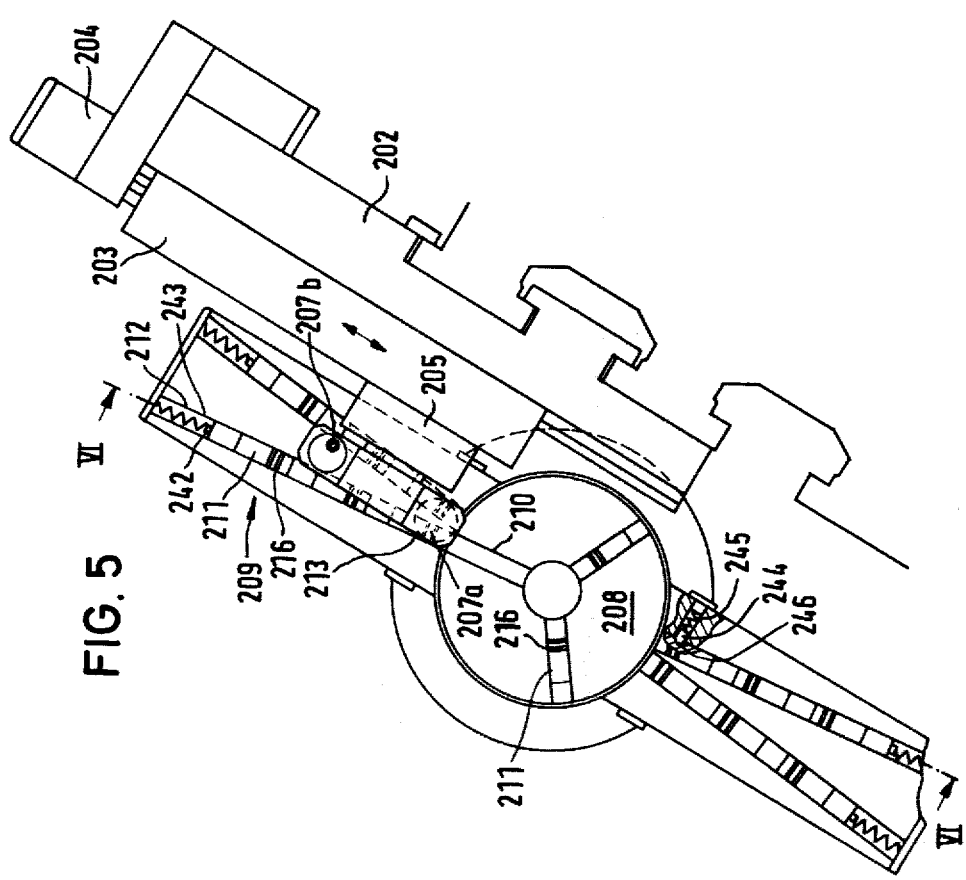

ARRANGEMENT FOR AUTOMATICALLY CHANGING CLAMPING JAWS OF THE CHUCK OF A MACHINE TOOL

BACKGROUND OF THE INVENTION

The invention relates to an arrangement for automatically changing clamping jaws of the chuck of a machine tool having a turning carriage and a cross-slide rest, with a clamping jaw magazine which has guides for the clamping jaws stored therein which may be aligned with the clamping jaw guides of the chuck and with a transfer device having a transfer element which is movable in the direction of the aligning guides.

Such an arrangement is known from the German Offenlegungsschrift No. 26 24 775.

In the case of the known arrangement, the clamping jaw magazine may be rotated about the chuck axis by means of its own drive. The transfer device also has a separate drive by means of which the transfer element may be displaced.

An important object of the invention is to produce an arrangement of the initially described type which is distinguished by low expenditure on machine elements and/or drive means.

SUMMARY OF THE INVENTION

According to the invention the object stated above is achieved by providing the transfer element on the cross-slide rest.

The solution according to the invention uses the cross-slide rest drive, which is present in any case, for sliding the clamping jaws from the magazine into the chuck and vice versa. A separate drive for the transfer device is therefore unnecessary.

The transfer element consists advantageously of a carrier bolt which is fixed in place of a tool in a toolholder clamped on the cross-slide rest. The clamping jaws must then be provided at their clamping side with recesses for the engagement of the carrier bolt.

The recess may be designed as bores. However, it is also possible for the recesses to consist of grooves running transversely to the direction of displacement of the clamping jaws.

Proceeding from the latter possibility, a specific embodiment of the arrangement according to the invention, in which the guides in the magazine run, as known, radially and perpendicularly to the chuck axis, may consist in the magazine being fixed and in the guides in the magazine with the displacement direction of the cross-slide rest forming so small an angle that the carrier bolt within its displacement range required for changing the clamping jaws still remains in the groove.

With this specific embodiment it is possible for the magazine to have two guides on opposite sides of the chuck, the angle formed by these guides being bisected by a parallel line extending perpendicularly and radially to the chuck axis.

In a second specific embodiment of the arrangement according to the invention provided, as known, with a drum magazine which is rotatable about a drum axis extending radially and perpendicularly to the chuck axis, the rotary axis of the drum magazine may extend parallel to the displacement direction of the cross-slide rest.

In a further advantageous development several clamping jaws may be stored one behind the other in each guide of the magazine, the clamping jaws in the magazine may be prestressed in the direction of the chuck by a spring mechanism and at its end facing the store, each guide of the magazine may have a stopping mechanism which prevents the clamping jaws being ejected unintentionally from the guide as a result of the spring mechanism, but which allows the clamping jaws to be displaced by the transfer element.

If the arrangement according to the invention is provided, as known, with a magazine which is rotatable about the chuck axis and whose guides extend radially and perpendicularly to the chuck axis, then a third specific embodiment may be characterised by a coupling mechanism between the chuck and magazine. Although the magazine is rotatable here, it does not need its own drive for the rotation. It is rather possible, when the coupling mechanism is connected in, for the magazine to corotate with the chuck.

The known arrangement, too, has an indexing mechanism for accurate alignment of the chuck and magazine in the changing position. This consists here of hydraulically displaceable indexing bolts. As an alternative to this, a development of the invention proposes that a backwardly directed toothed ring be provided in each case on the outer periphery of the rear of the chuck and the inner periphery of the rear of the magazine and that a coupling toothed ring, which is displaceable parallel to the chuck axis, be arranged opposite the two toothed rings. With the same number of storage places in the magazine, an indexing mechanism constructed in this manner is less expensive.

An indexing mechanism of this type is used to particular advantage when the magazine is rotatable about the chuck axis. In this case, the indexing mechanism may also simultaneously form the coupling mechanism, if the coupling toothed ring is displaceable by means of a ring piston which preferably is operated hydraulically. Compared with the known indexing bolt, the ring piston has the advantage of being not only displaceable in the direction of the chuck axis, but also of being rotatable about this.

Exemplary embodiments of the invention are described in the following with reference to the drawings.

BRIEF DESCRIPTION OF THE DRAWINGS

In the drawings:

FIG. 3 is an enlarged fragmentary view in elevation of the most important components of a further embodiment of the invention with a drum magazine.

FIG. 4 is a view in section taken along the line IV—IV in FIG. 3.

FIG. 5 is a view similar to FIG. 3 of the most important components of a third embodiment of the invention with a rod magazine.

FIG. 6 is a view in section taken along the line VI—VI through FIG. 5.

DESCRIPTION OF THE PREFERRED EMBODIMENTS

Figure 1:
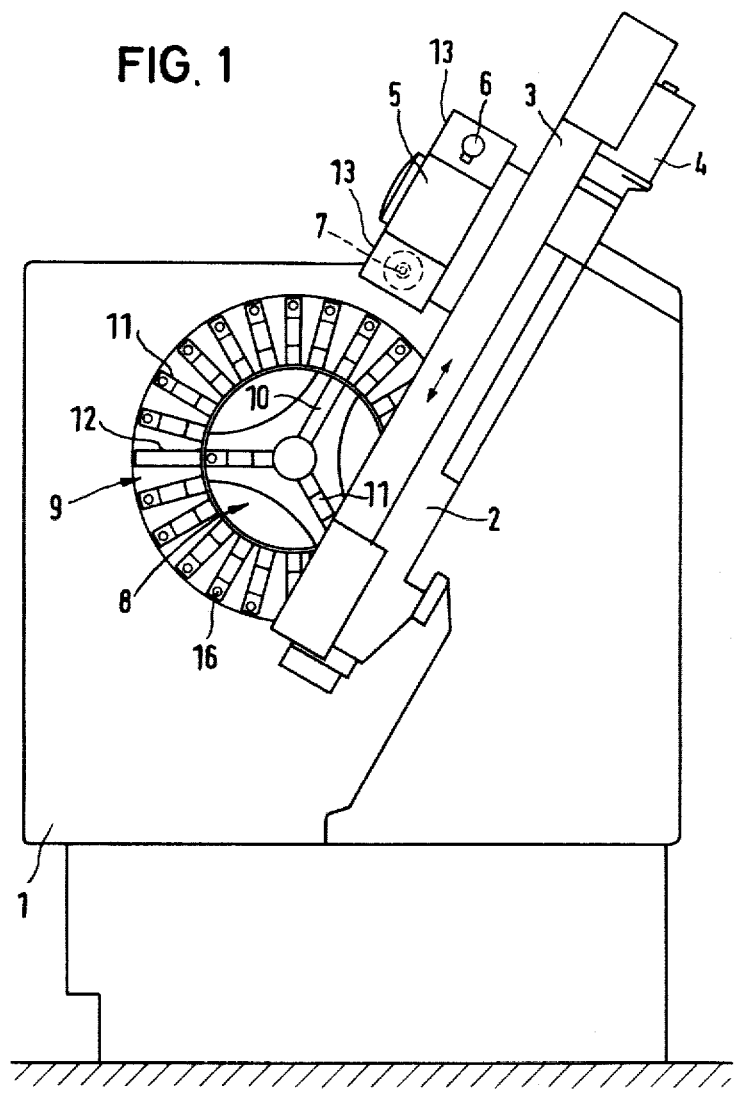
FIG. 1 is a side view of a turning machine with a clamping jaw magazine annularly enclosing the chuck.

FIG. 1 shows a turning machine. The headstock is designated by 1. A turning carriage 2 bearing a cross-slide rest 3 which may be displaced perpendicularly thereto is arranged displaceably on an inclined base.

The drive for displacing the cross-slide rest 3 in the direction of the arrow is designated by 4. A tool revolver 5 is located on the cross-slide rest. Two tool-holders 13 are fixed to the tool revolver 5. One of the tool-holders 13 carries a turning tool 6. The other tool-holder 13 bears a carrier bolt 7.

The turning chuck designated by 8 is enclosed by a ring magazine 9. The ring magazine contains a number of storage places for clamping jaws 11. The clamping jaws 11 are arranged in the ring magazine 9 so as to be radially displaceable in guides 12. The clamping jaw guides of the turning chuck 8 are designated by 10.

When the cross-slide rest 3 is displaced, the carrier bolt 7 moves radially and perpendicularly to the chuck axis. The clamping jaws 11 are provided with holes 16 into which the carrier bolt 7 may be inserted by displacement of the turning carriage 2. The subsequent displacement of the cross-slide rest 3 enables the change of clamping jaws between the magazine 9 and the chuck 11 to take place, if the corresponding guides 10 and 12 of the chuck 8 and magazine 9 are in alignment.

The magazine 9 may be rotated about the chuck axis, but it does not have its own drive. As described in connection with FIG. 2, it is turned into the suitable position for the change by the drive of the chuck 8.

Figure 2:
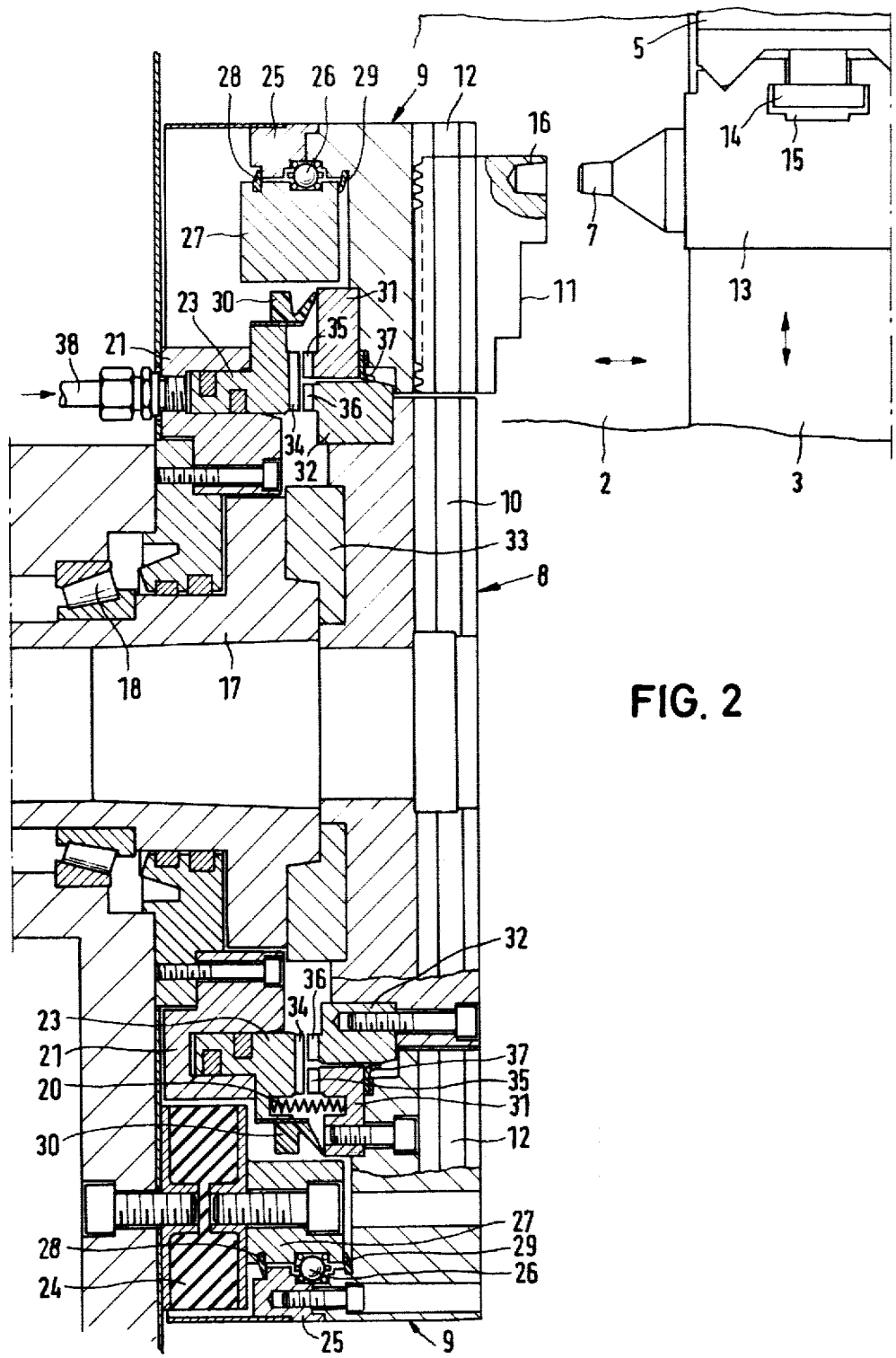
FIG. 2 is a view in vertical-section through the chuck and the ring magazine in FIG. 1 and illustrates the transfer device.

As will be seen from FIG. 2, the chuck axis 17 is mounted by means of a bearing 18 in a component 22 which is fixed to the machine. The component of the chuck 8 provided with guides 10 is securely connected to the chuck axis 17 via an intermediate ring 33.

An annular holding component 27 is fixed on the headstock 1 by rubber buffers 24. Rotatably mounted thereon by means of a swivelling ball bearing 26 is an annular component 25 which is securely connected to the magazine ring 9 containing the clamping jaw guides 12. Seals 28 and 29 ensure that the swivelling ball bearing 26 does not become dirty.

A toothed ring 31 having backwardly directed teeth 35 is disposed on the inner rear periphery of the magazine ring 9.

There is also a toothed ring 32 with teeth 36 also pointing to the rear on the rearward outer periphery of the chuck body bearing the guides 10. A ring cylinder body 21, in which a ring piston 23 is rotatably mounted so as to be axially displaceable, is fixed to the headstock 1. The cylinder chamber may be acted upon by hydraulic fluid via a line 38. The ring piston 23 is constructed simultaneously as a toothed ring whose teeth 34 are directed towards the front and when the ring piston 23 is displaced to the right, these may engage with the teeth 35 and 36 of the toothed rings 31, 32. A sealing ring 30 ensures that the teeth 34, 35, 36 remain clean. On the other side a ring seal 37 ensures that no dirt reaches the teeth 34, 35, 36. A spring 20 presses the ring piston 23 back from the toothed rings 31, 32 if the cylinder chamber is pressureless. If the magazine ring 9 is to be moved into another changing position, hydraulic fluid is supplied to the pressure line 38. In this way the teeth 34, 35,36 engage with each other. The chuck is now slowly rotated until the magazine ring 9 has reached the required changing position.

The teeth 34, 35, 36 remain engaged during the changing process. Their purpose is not only to turn the magazine ring 9 with the chuck 8, but they also have an indexing function, i.e., they should ensure that the guides 10 of the chuck 8 and the guides 12 of the magazine ring 9 are in exact alignment.

If another changing position is to be used between the magazine ring 9 and the chuck 8, the cylinder chamber is emptied so that the ring cylinder 23 may move back. The teeth 34, 35, 36 then disengage. Other guides 10 and 12 may then be aligned with each other in each case by rotating the chuck 8 relative to the magazine ring 9. For exact alignment, the teeth 34, 35, 36 are then brought to engage again.

It is necessary for the changing process for the magazine ring 9 and the chuck 8 to be brought into a rotating position in which the guides 10 and 12, between which the displacement of the relevant clamping jaws 11 is to be effected, are aligned exactly parallel to the direction of displacement of the cross-slide rest 3.

FIG. 2 shows how the tool-holder 13, which carries the carrier bolt 7, is secured to the tool revolver 5. The tool revolver 5 is provided with a clamp piston 14 which engages in an undercut groove 15 of the tool-holder 13. The clamp piston 14 thus pulls the tool-holder 13 against the tool revolver 5.

In the embodiment represented in FIGS. 3 and 4, the turning carriage is designated by 102 and the cross-slide rest by 103. The drive for the cross-slide rest 103 is designated by 104. A tool revolver 105 which carries two tool-holders 113 is located on the cross-slide rest 103. A turning tool 106 is located on one of the tool-holders 113. The other tool-holder 113 carries a carrier bolt 107 directed towards the chuck 108.

The clamping jaws 111 are provided here with grooves 116, into which the carrier bolt 107 can engage, extending transversely to the direction of displacement. In the case of the embodiment according to FIGS. 3 and 4, bores (such as 16 in FIG. 2) could also be provided in place of the grooves.

A holding plate 140 for a drum magazine 109 is fixed to the headstock by means of rubber buffers 124. The drum magazine 109 is rotatable about the drum axis by means of a rotary drive 141. The drum magazine has four guides 112 for the clamping jaws 111. Several clamping jaws 111 are arranged one behind the other in the guides 112.

The drum axis extends perpendicularly and radially to the chuck axis. By means of the suitable rotation of the drum magazine one guide 112 can be brought into alignment in each case with a corresponding guide 110 of the chuck 108. For the changing procedure the carrier bolt 107 is brought by means of the displacement of the turning carriage 102 into the corresponding groove 116 of the clamping jaws 111 of the drum magazine 109 which are positioned next to the chuck 108. Then, by means of the displacement of the cross-slide rest 103 in the direction of the chuck 108, the clamping jaws 111 are inserted into the guide 110 of the chuck 108.

The clamping jaws 111 in the drum magazine 109 are prestressed in the direction of the chuck 108 by springs 143. A pressure component 142, on which the spring 143 bears, rests on those clamping jaws 111 lying the furthest away from the chuck 108. A separate spring mechanism is provided for each guide 112.

The indexing is also effected by means of a ring piston 123 in the case of the embodiment shown in FIGS. 3 and 4. The ring piston 123 consists of a toothed ring having teeth 134 pointing towards the front. A further toothed ring 131 with teeth 135 pointing towards the rear is arranged, so as to be secured to the machine, on the holding plate 140. A further toothed ring 132, similarly with teeth 136 pointing towards the rear, is fixed to the rearward, outer periphery of the chuck 108. When the ring piston 123 is actuated, the teeth 134, 135, 136 engage and fix the chuck 108 so that the selected guide 110 aligns exactly with the guide 112 of the drum magazine 109 which has been brought to the changing position.

In FIG. 5 the cross-slide rest 203 is arranged on the turning carriage 202 so as to be displaceable by means of a drive 204. The cross-slide rest carries a tool revolver 205 with two tool-holders 213. Each tool-holder contains a carrier bolt 207a, 207b. A two-part rod magazine 209 is arranged on both sides of the chuck 208. Each part of the rod magazine 209 has two guides 212 which together form a pointed angle. The angle bisector of this angle extends parallel to the direction of displacement of the cross-slide rest 203. Each guide 212 contains several clamping jaws 212 arranged one behind the other with receiving grooves 216 for the carrier bolts 207a, 207b, extending transversely to the direction of displacement. Each guide 212 is provided with a spring mechanism. This consists of a spring 243 which bears on a pressure part 242. The clamping jaws 211 lying next to the chuck 208 are securely fixed in each groove 212 by a stopping mechanism which prevents the clamping jaws 211 being pushed out of the guide 212 by the spring mechanism. The stopping mechanism consists of a stopping bolt 244 which is pressed against the relevant clamping jaws by a spring 245. The clamping jaws have a lateral stopping recess 246 for this purpose.

The guide 210 of the chuck 208 in which the change is to take place or from which clamping jaws 211 are to be exchanged, must be brought into alignment with the relevant guide 212 of the rod magazine 209 by rotating the chuck 208. By displacing the turning carriage 202 the relevant carrier bolt 207a, 207b is then inserted into the groove 216 of the clamping jaws lying next to the chuck 208. In the present case, this is the carrier bolt 207a. This is co-ordinated with the left guide 212. The carrier bolt 207b is co-ordinated with the right guide 212. As the two guides 212 do not run parallel to the displacement direction of the cross-slide rest 203, the carrier bolt 207a, 207b displaces when the cross-slide rest 203 in the relevant groove 216 of the chuck 211 is displaced.

It will be seen from FIG. 6 that the rod magazine 209 is fixed to the machine by means of rubber buffers 224. The indexing mechanism here is similar to that of the embodiment of FIGS. 3 and 4. A toothed ring 232 whose teeth 236 point towards the rear is fixed to the rearward periphery of the chuck 208. A further toothed ring 231 having teeth 235 which also point towards the rear is attached to the rod magazine 209. A ring cylinder 223 is arranged so as to be displaceable parallel to the chuck axis, in an annular cylinder component fixed to the machine. The ring cylinder 223 is constructed as a toothed ring having teeth 234 pointing to the front. If the cylinder chamber is acted upon with pressure fluid, the teeth 234 engage in the teeth 235 and 236, producing indexing. A spring 239 ensures that the annular cylinder 223 is pressed back again when the cylinder chamber is relieved of pressure. A sealing ring 230 prevents the teeth 234, 235, 236 becoming dirty.

To those skilled in the art to which this invention relates, these and many other such changes in construction and widely differing embodiments and applications of the invention will suggest themselves without departing from the spirit and scope of the invention. The disclosures and the descriptions herein are purely illustrative and are not intended to be in any sense limiting.

We claim:

1. An arrangement for automatically changing clamping jaws of the chuck of a machine tool having a turning carriage and a cross-slide rest, comprising:
   a clamping jaw magazine having aligning guides for the clamping jaws stored therein and alignable with the clamping jaw guides of the chuck, and
   a transfer device having a transfer element displaceable in the direction of the aligning guides,
   said transfer element being on the cross-slide rest.

2. An arrangement according to claim 1, wherein the transfer element comprises:
   a tool-holder,
   a carrier bolt fixed in place of a tool on the tool-holder and clamped on the cross-slide rest,
   said clamping jaws being provided on their clamping side with recesses for the engagement of the carrier bolt.

3. An arrangement according to claim 2, wherein said recesses have grooves running transversely to the direction of displacement of the clamping jaws.

4. An arrangement according to any of claims 1 to 3 in which
   the guides in the magazine run radially and perpendicularly to the chuck axis, the magazine being fixed,
   the guides in the magazine with the direction of displacement of the cross-slide rest forming such a small angle that the carrier bolt within its range of displacement required for the change of clamping jaws still remains in the groove.

5. An arrangement according to claim 4, wherein the magazine has two guides on opposite sides of the chuck, the angle formed by these guides being bisected by a parallel line extending perpendicularly and radially to the chuck axis.

6. An arrangement according to any one of claims 1 to 3, wherein said magazine is a drum magazine which can be rotated about a drum axis extending radially and perpendicularly to the chuck axis, the axis of rotation of the drum magazine lying parallel to the direction of displacement of the cross-slide rest.

7. An arrangement according to claim 1 wherein,
   several clamping jaws are stored one behind the other in each guide of the magazine,
   spring means for prestressing the clamping jaws in the magazine in the direction of the chuck, and
   stopping means for each guide of the magazine at the end of the guide facing the magazine for preventing the clamping jaws from being ejected unintentionally from the guide as a result of said spring means, said stopping means enabling the clamping jaws to be displaced by said transfer element.

8. An arrangement according to one of the claims 1 or 2 wherein,
   said magazine may be rotated about the chuck axis, with said guides running radially and perpendicularly to the chuck axis, and
   coupling means between said chuck and said magazine.

9. An arrangement according to claim 8, having,
   indexing means for accurately aligning the chuck and the magazine in the changing position,
   the indexing means also forming the coupling means.

10. An arrangement according to claim 1 wherein
    said magazine may be rotated about the chuck axis and having indexing means for accurately aligning the chuck and the magazine in the changing position, a backwardly directed toothed ring provided in each case at the outer periphery of the rear of the magazine, and, opposite the two toothed rings, a coupling toothed ring which is displaceable parallel to the chuck axis.

11. An arrangement according to claim 10, having a ring piston for displacing the coupling toothed ring.

12. An arrangement according to claim 11, having hydraulic means for operating said ring piston.

* * * * *